United States Patent [19]
Fuchs

[11] Patent Number: 4,843,535
[45] Date of Patent: Jun. 27, 1989

[54] SWITCHING POWER SUPPLY

[75] Inventor: Erich Fuchs, Paderborn, Fed. Rep. of Germany

[73] Assignee: Nixdorf Computer AG, Paderborn, Fed. Rep. of Germany

[21] Appl. No.: 249,476

[22] Filed: Sep. 26, 1988

[30] Foreign Application Priority Data

Oct. 27, 1987 [DE] Fed. Rep. of Germany ....... 3736372

[51] Int. Cl.$^4$ .......................... H02J 9/00; H02M 7/00
[52] U.S. Cl. ........................................ 363/71; 307/49; 307/66
[58] Field of Search ............................ 363/65, 71, 72; 307/43–49, 64–66, 82, 85, 86, 87

[56] References Cited

U.S. PATENT DOCUMENTS

| | | | |
|---|---|---|---|
| 4,564,767 | 1/1986 | Charych | 307/66 |
| 4,694,194 | 9/1987 | Hansel et al. | 307/66 |
| 4,745,299 | 5/1988 | Eng et al. | 307/64 X |

FOREIGN PATENT DOCUMENTS 3637560 11/1986 Fed. Rep. of Germany .

Primary Examiner—Patrick R. Salce
Assistant Examiner—Emanuel Todd Voeltz
Attorney, Agent, or Firm—Dykema Gossett

[57] ABSTRACT

The invention relates to a switching power supply with a battery branch circuit provided for an emergency power supply, which can, similar to the primary circuit, be switched on in case of an emergency, by a switching transistor (13, 43). The battery branch circuit is connected in parallel with the secondary winding (7, 37) of transformer (4) and poled unidirectional with the current pulses which are induced in the secondary winding (7, 37) from the primary side during mains operation. The second switching transistor (13, 43) is switched on during the respective on-phase of the primary-side switching transistor (6), but, relative to this, is switched on later and switched off earlier.

29 Claims, 2 Drawing Sheets

SWITCHING POWER SUPPLY

"TECHNICAL FIELD"

The present invention relates to a switching power supply with a switching transistor connected in series with a primary winding of a transformer and the rectified a.c. voltage, which is periodically switched on by first control pulses, thereby inducing current pulses in the secondary winding the energy of which is used for the generation of an output d.c. voltage, wherein a battery branch circuit is provided in which another switching transistor is switched on by second control pulses and in which energy is supplied for the generation of an output d.c. voltage the event of a mains failure.

BACKGROUND ART

A switching power supply, of the kind mentioned above is disclosed in West German Patent Publication DE-OS 36 37 560. In this prior switching power supply, the battery branch circuit is switched on in the event of a mains a.c. voltage failure so that the functions of a load can be sustained over a certain period after the mains failure. A special monitoring circuit is provided therefor which supplies control pulses either to the first or to the second switching transistor dependent on the existence of mains voltage. When the control pulses are transferred to the second transistor, the current pulses generated with it in the battery branch circuit are directly transferred to an output filter or to the load.

This known principle of an emergency power supply in switching power supplies requires an enormous expenditure to provide the necessary control and energy transfer. When several output voltages are generated, apart from the monitoring circuit for the switching of the control pulses from a first to a second control line, each single output voltage requires a special battery branch circuit to sustain it during mains failure.

SUMMARY OF THE INVENTION

It is an object of the invention to simplify the design of a switching power supply with an emergency power supply so that in case of a mains failure automatic switch over to the emergency power supply is provided independent of special monitoring of the mains a.c. voltage, and so that a single emergency battery can also be used for generating several output voltages.

This object is achieved for a switching power supply as described above according to the invention such that the battery branch circuit is connected in parallel with the secondary winding of the transformer and poled unidirectional with the current pulses induced in the secondary winding, and that the second switching transistor is conductive during the respective on-phase of the first switching transistor, but, relative thereto, is switched on later and switched off earlier.

The invention is based upon the idea of connecting a generator for the output power and not the load itself in parallel with a battery branch circuit which automatically becomes effective in case of a mains failure and supplies current pulses to the transformer, which correspond to the current pulses previously delivered by the main power supply. By use of the control according to the invention, identical operation of both switching transistors is achieved. This can be obtained, e.g., by an appropriate dimensioning of the first and the second control pulses.

The battery branch circuit, however, can only supply a pulse-like current via the second switching transistor to the secondary winding of the transformer, if no feeding of the transformer from the primary side takes place. This is assured by the state of the voltage at the secondary winding of the transformer in connection with the dependency on the direction of the current in the battery branch circuit.

Thus, the function of feeding a pulse-like current into the secondary winding of a transformer is taken over automatically and without any interruptions by the battery branch circuit. All other functions on the secondary side of the switching power supply can remain unmodified, especially the generation of different sizes of output voltages from several secondary windings or from tap connections of a secondary winding of the transformer so that also in this case only one single emergency battery is needed.

When a diode is arranged in the battery branch circuit, which is poled unidirectional with the further switching transistor and the battery, the current direction dependency already determined by the switching transistor is further improved so that the automatic switching over to the emergency power supply remains reliably limited to mains failure even at relatively high potential values at the secondary winding of the transformer.

By the identical manner of control of the two switching transistors, the invention has the essential advantage that the second switching transistor can be included in a control circuit as it is usually provided for the primary-side switching transistor of switching power supplies. Accordingly, the embodiment of the invention has the special feature that the first and the second control pulses are generated by a pulse-length modulated pulse generator. This offers the advantage that also in the event of a mains failure, the output voltage can be sustained at a constant level despite decreasing battery voltage as also the second control pulses for the second switching transistor are pulse-length modulated dependent on the output voltage. Simultaneously, there is the advantage that by continuation of the first control pulses for the primary-side switching transistor, the taking over of the feeding by the mains in upon re-establishment of the mains power supply is effected without any interruption.

It is advantageous if the series connection of the further switching transistor with the diode is connected in parallel to the series connection of a charging current control with another diode, such other diode being arranged in a forward direction for the current pulses induced to the secondary winding.

This embodiment which will be described later results in recharging of the battery during the on-phases of the primary-side switching transistor.

When applying a control circuit for the generation of the first and the second control pulses, monitoring of the battery voltage can easily be provided, which causes the blocking of the second control pulses within the control circuit if the battery voltage drops below a predetermined value. Thus, a deep discharge of the battery during an exceptionally long mains failure is avoided. In an embodiment of the invention such a circuit concept is combined with a preceding signalling.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
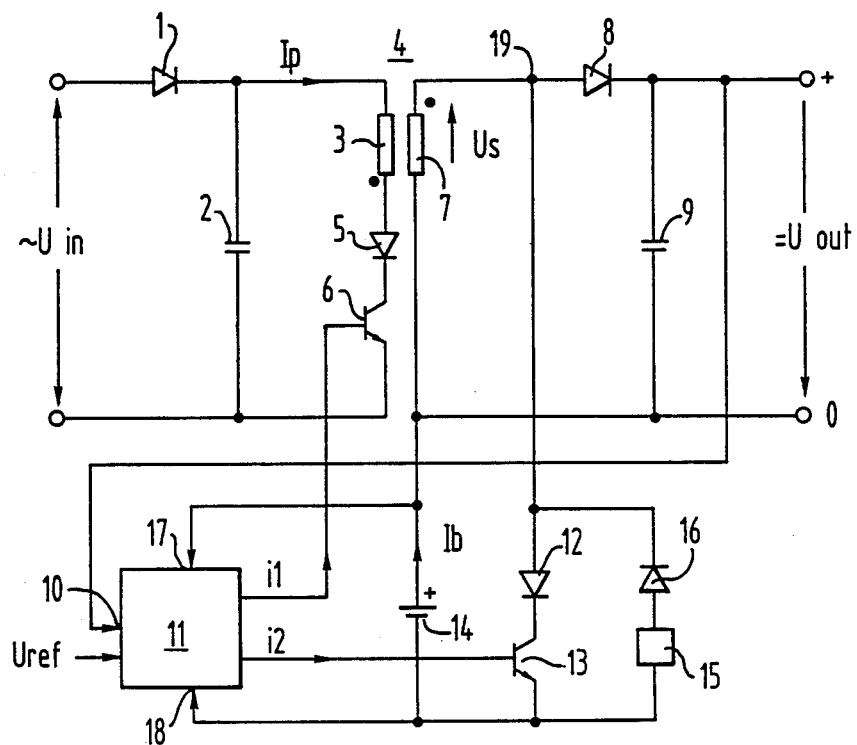
FIG. 1 is a schematic diagram of a blocking converter switching power supply with a battery branch circuit.

In FIG. 1 the circuit of a switching power supply is shown which operates as a blocking converter and which is fed by an a.c. voltage Uin. The mains a.c. voltage is rectified by the rectifier 1, and the thus obtained pulsating d.c. voltage is smoothed by a capacitor 2. The smoothed d.c. voltage lies at the series connection of the primary winding 3 of transformer 4, of diode 5, and of a npn-type switching transistor 6. When the switching transistor 6 is switched on in a pulse-like manner by first control pulses i1, a secondary voltage Us will be conventionally induced in the secondary winding 7 of transformer 4, respectively, by the primary-side pulse-like switching current Ip, the direction of which is determined by the sense of winding of the secondary winding 7 which is opposite to that of primary winding 3 and the polarity of which is reversed respectively when the primary side switching transistor 6 is switched off so that then the energy stored in the transformer can be supplied to a smoothing capacitor 9 via another rectifier 8 at which the output d.c. voltage Uout appears which can be used for feeding a load. The control pulses i1 are delivered from a control circuit 11 which, in turn, is controlled by the output voltage Uout at its control input 10 and which determines the length of the control pulses i1 dependent on the relation to a reference voltage Uref such that a substantially constant output d.c. voltage Uout is obtained.

Instead of a pulse-length modulation, also a frequency modulation of the control pulses i1 can be provided in the circuit control 11.

The above-described function is known for switching power supplies which operate as a blocking converter. The additional emergency power supply of the circuit arrangement as shown in FIG. 1 is described hereinafter.

A battery branch circuit is connected in parallel with the secondary winding 7 of the transformer 4, which has a diode 12, a second npn-type switching transistor 13 and a battery 14. With its positive terminal, the battery 14 lies at the zero potential of the secondary circuit, and diode 12 and switching transistor 13 are poled in a forward direction for a current Ib which is delivered by battery 14. The switching transistor 13 is switched on by current pulses i2 which are, as well as control pulses i1, generated by control circuit 11 but which, relative to them, start later and finish earlier.

The series connection of a charging current control 15 with another diode 16 is connected in parallel with the series connection of diode 12 with the switching transistor 13. Diode 16 is connected in a polarity which is opposite to that of diode 12. This series connection is applied for charging the battery 14 during the switching phases of the primary-side switching transistor 6.

The battery 14 is connected to the control inputs 17 and 18 of the control circuit 11 in order to monitor the battery voltage in the control circuit 11 and to switch off the control pulses i2 dependently in a way which will be described later.

Figure 2:
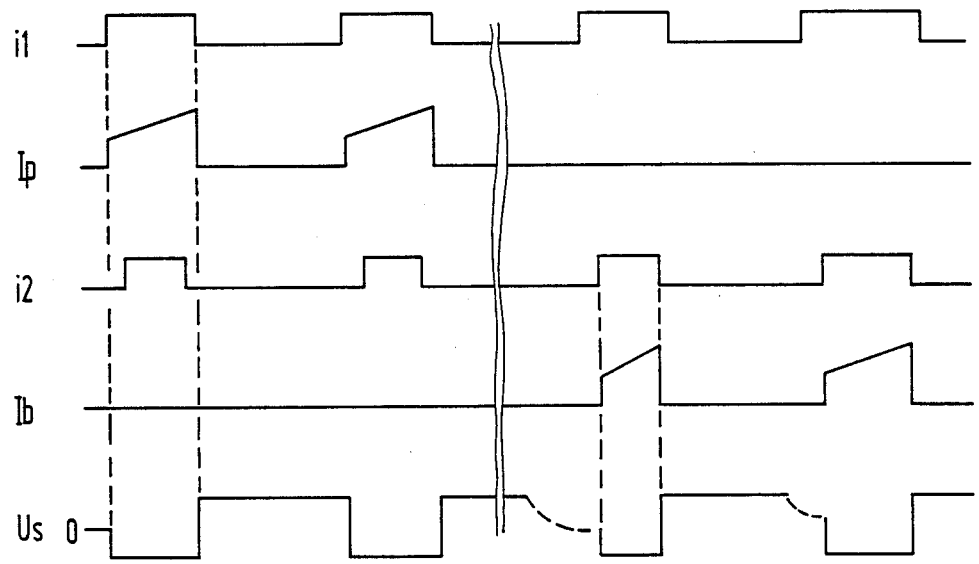
FIG. 2 shows current and voltage curves of the circuit shown in FIG. 1.

In the following, the mode of operation of the circuit arrangement as shown in FIG. 1 is described with reference to FIG. 2. In FIG. 2, signal waveforms are shown within the switching power supply. It can be seen therefrom that the control pulses i1 and i2 have an essentially corresponding phase position but that control pulses i2 start later and stop earlier than control pulses i1. Consequently, control pulses i1 and i2 are of the same kind but have a different length. With each control pulse i1, a current Ip flows through the primary winding 3 of the transformer 4 since the control pulse i1 causes the switching transistor 6 to be switched on. Current Ip has a relatively linear increase caused by the inductivity of the primary winding 3 of the transformer 4, and a length corresponding to the length of control pulse i1. Correspondingly, the current pulses Ip as shown in FIG. 2 for mains operation are obtained. During these current pulses Ip a secondary voltage Us is induced in the secondary winding 7 of transformer 4, which is negative at terminal 19 (FIG. 1) of secondary winding 7 with respect to the secondary-side zero potential. This results from the different senses of winding of the two windings 3 and 7 of transformer 4, which is indicated by dots at the end of the windings in FIG. 1. When the respective primary-side current pulse Ip is finished, the polarity of the voltage at terminal 19 of the secondary winding 7 of transformer 4 is reversed so that it becomes positive with respect to the zero potential. Then, during the off-phase of the primary-side switching transistor 6, the electric energy stored in transformer 4 can be transferred to a secondary-side load. This results in a current flow via the secondary-side rectifier 8 to the load. During this current flow, the output d.c. voltage is smoothed by capacitor 9.

In mains operation, the above-described procedures are repeated periodically. During this, the secondary-side switching transistor 13 in the battery branch circuit is switched on by the control pulses i2 in the same manner as the primary-side switching transistor 6. However, current flow in the battery branch circuit is prevented, since, during the control pulse i2, the terminal 19 of the secondary winding 7 (FIG. 1) has a negative potential with regard to the negative pole of the battery 14, with respect to which diode 12 or switching transistor 13 is poled in a blocking direction. Consequently, during the control pulses i2 the battery cannot be discharged in mains operation. It is charged by an electric circuit which is poled in a forward direction for the negative potential at terminal 19 of the secondary winding 7 and which comprises diode 16 and charging control 15. At the end of each control pulse i1, when the polarity at terminal 19 of the secondary winding 7 is reversed to the positive potential, the secondary-side switching transistor 13 has already been switched off, and the charging branch circuit with diode 16 and charging current control 15 has already been poled in the reverse direction for this potential.

This is the significance of the later start and the earlier finishing of the control pulses i2 compared with the control pulses i1. Since a certain length of time is always necessary for the building up of the negative potential at terminal 19, the switching transistor 13 is only be switched on after that time, avoiding a flow of battery current. Then, the switching transistor 13 shall be switched off in advance of switching transistor 6 so that it is not loaded with a high current by the positive potential re-establishing at terminal 19.

In case of a mains failure, the current pulses Ip vanish although the primary-side switching transistor 6 is switched on in a pulse-like manner. Terminal 19 of the secondary winding 7 of the transformer 4, which has a positive potential at the end of each primary-side current pulse Ip with respect to the secondary-side zero potential, now reduces its positive potential without a further switching to a negative potential. This function is indicated for battery operation in FIG. 2 as potential drop by dotted lines. The energy stored in the transformer 4 during the preceding switching phase of the primary-side switching transistor 6, thus, is transferred completely to capacitor 9 or to the secondary-side load, and terminal 19 of the secondary winding 7 of transformer 4 gets the secondary-side zero potential. During the next control pulse i2, this causes a battery current Ib to flow in the secondary winding 7 of transformer 4 which, similar to a current pulse Ip, produces a negative potential at terminal 19 relative to the secondary-side zero potential, the polarity of which will again be reversed to a positive potential at the end of control pulse i2. The energy thus stored in transformer 4, then, can be transferred to the secondary-side load or capacitor 9 without any current interrupt between mains failure and battery power supply.

As the control pulses i2 are shorter than control pulses i1, normally the output d.c. voltage would drop. This, however, results in a longer duration of the control pulses i1 and i2 in the control circuit 11. This is indicated for battery operation in the righthand side of FIG. 2. This extension results in a corresponding extension of the battery current pulses Ib by which a predetermined output d.c. voltage can be sustained, and the potential drop in the positive parts of the secondary voltage Us, which is indicated for battery operation by a dotted line in FIG. 2, finally vanishes. The advantage of sustaining control pulse i1 for the switching transistor 6 also during battery operation lies in the fact that an immediate energy supply is effected when the mains power supply is restarted again.

Figure 3:
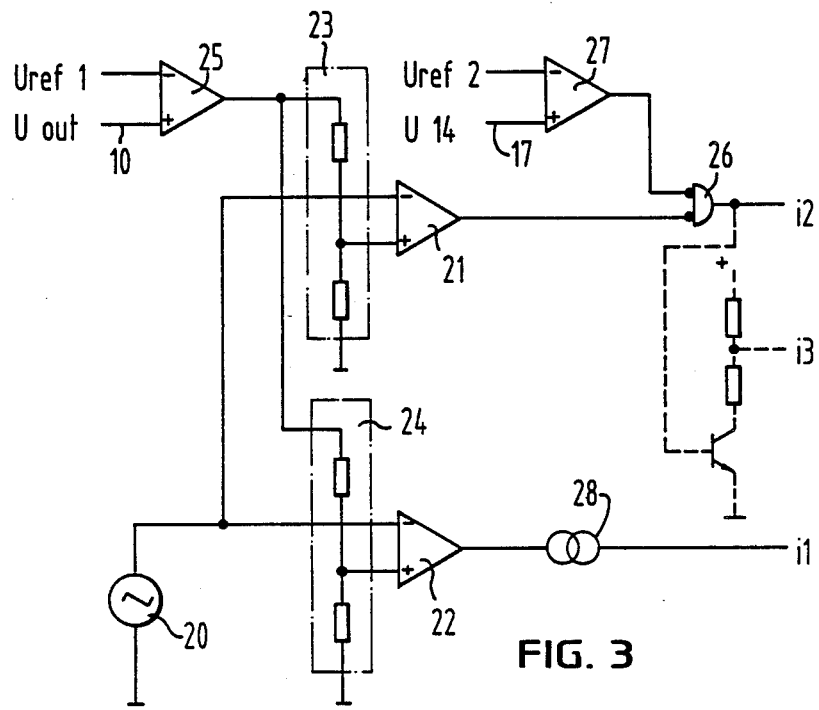
FIG. 3 shows an embodiment of a control circuit of the switching power supply as shown in FIG. 1.

In FIG. 3 a possible embodiment of the control circuit 11 of FIG. 1 is shown. There is provided a conventional triangle generator 20 whose output signals are transferred to the negative (inverting) inputs of two comparators 21 and 22. The positive (non-inverting) inputs of these comparators 21 and 22 are respectively connected to the tap of voltage divider 23 or 24. Both voltage dividers 23 and 24 are connected to the output of an operational amplifier 25 to whose negative (inverting) input a reference voltage Uref1 and to whose positive (non-inverting) input 10 the output d.c. voltage Uout of the switching power supply is transferred. The output of comparator 21 is connected to the first input of a conjunctive logic element 26 whose second input receives the output signal of another comparator 27 to whose negative (inverting) input a reference voltage Uref2 and to whose positive (non-inverting) input 17 the battery voltage U14 of battery 14 (FIG. 1) is transferred. Comparator 22 generates the control pulses i1 via a decoupling circuit 28 which effects the galvanic separation of the mains power supply and the secondary side of the switching power supply. The control pulses i2 are delivered by the logic element 26.

Hereinafter, the function of the circuit arrangement as shown in FIG. 3 will be described. The output signal of the operational amplifier 25 is the setting value for the regulating circuit. This signal increases and decreases according to the increase or decrease of the output d.c. voltage Uout. It is used for generating a threshold voltage for comparators 21 and 22 by the voltage dividers 23 and 24. Accordingly, at the output of comparators 21 and 22, a 0 Volt signal appears every time when the amplitude of the triangle signal generated by generator 20 exceeds the corresponding threshold voltage. With respect to the triangular form of the triangle signal generated by generator 22, the length of the output signals generated by comparators 21 and 22 is determined by the output signal of operational amplifier 25. The voltage dividers 23 and 24 are adjusted for division ratios such that comparator 22 receives a lower threshold voltage than comparator 21. This results in an earlier start and later end of the output signal of comparator 22 than that of comparator 21.

Comparator 27 generates a positive signal at its output as soon as the battery voltage U14 falls below the reference voltage Uref2. Thus, the opening conditions for the conjunctive logic element 26 no longer exist and the control pulses i2 vanish. This results in a constant blocking of the switching transistor 13 (FIG. 1).

Figure 4:
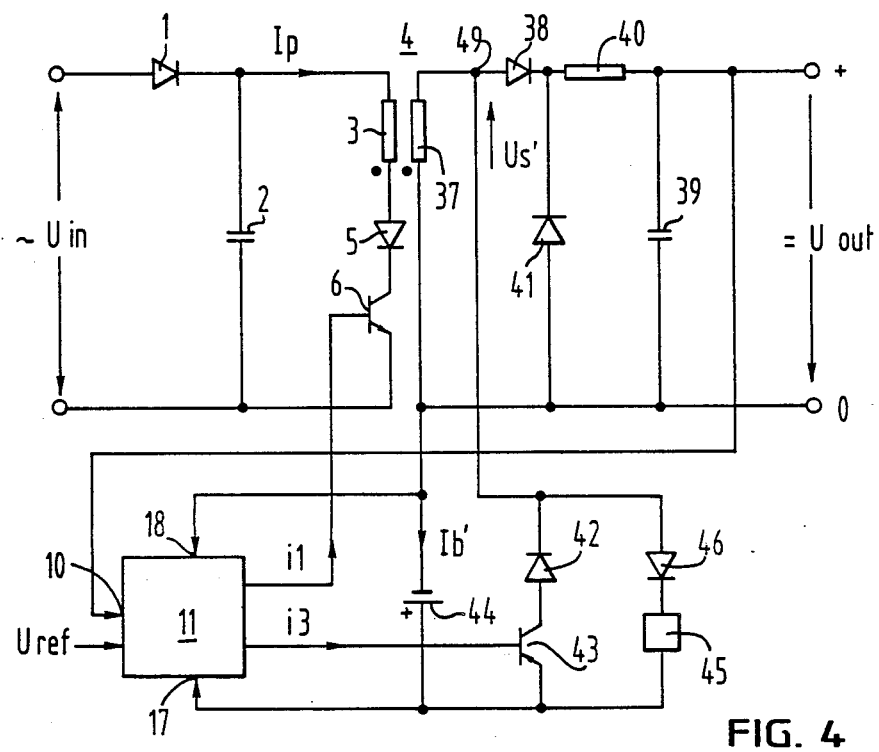
FIG. 4 is a schematic diagram of a forward converter switching power supply with a battery branch circuit.

In FIG. 4 a forward converter switching power supply is shown which is another practical embodiment of the invention and which is similar to that of FIG. 1. Therefore, the same reference characters as in FIG. 1 are used for the primary-side switching elements and the regulating circuit which generates the control pulses i1 and i3. However, according to the forward converter principle, the secondary winding 37 of transformer 4 has the same winding sense as primary winding 3, which is indicated by corresponding dots at winding 3 and 37 and which becomes clear by the direction of voltage Us opposite to that of FIG. 1. The current pulse which is induced in the switching phase of the primary-side switching transistor 6 is stored in the smoothing capacitor 39 directly via rectifier 38 and storage choke 40 which is a component necessary for a forward converter. Another necessary component for a forward converter, a freewheeling diode 41, is connected in series to storage choke 40.

A pnp-type transistor 43 which is connected in series with a diode 42 is used as second switching transistor in the battery branch circuit. This diode 42 and another battery 44 are poled such that, in case of mains operation, the battery branch circuit is blocked with regard to the positive potential at terminal 49 of secondary winding 37, but simultaneously the battery 44 is charged via a series connection consisting of a diode 46 and a charging current control 45 which is, analogous to FIG. 1, connected in parallel to the series connection consisting of a diode 42 and a switching transistor 43. Switching transistor 43 is controlled via control pulses i3 of control circuit 11. These control pulses correspond to control pulses i2 (FIG. 2) but do have, relative thereto, opposite signs. The generation of control pulses i3 by a npn-type transistor controlled by control pulses i2 is indicated in the circuit arrangement shown in FIG. 3 by dotted lines.

Due to the different current direction dependency of the battery branch circuit shown in FIG. 4, in case of a mains failure, a current pulse Ib' results during the respective on-phase of switching transistor 43, which corresponds to the current pulse induced in the secondary winding 37 during mains power supply. This is caused by the vanishing of the positive potential at terminal 49 of secondary winding 37 in case of mains failure and, afterwards, by terminal 49 having a negative potential during the switching phase of switching transistor 42 relative to the positive pole of battery 44.

The diodes 12 and 42, which are provided in the circuit arrangement of FIG. 1 and 4, are superfluous when a switching transistor 13 or 43 is used which is dimensioned such that it cannot change over to inverse operation when the blocking potential existing at terminal 19 or 49, respectively, is applied.

What is claimed is:

1. In a switched power supply of the type including a transformer (4) having a primary winding (3) and a secondary winding (7, 37), a first switching transistor (6) connected in series with the primary winding (3) and a rectified a.c. voltage supplied to the primary winding (3) wherein the first switching transistor (6) is periodically switched on by a first set of control pulses to thereby induce current pulses in the secondary winding (7, 37), the energy of which current pulses is used to generate an output d.c. voltage, and a battery branch circuit including a second switching transistor (13, 43) periodically switched on by a second set of control pulses to generate the output d.c. voltage in the event of a mains failure, the improvement comprising:

said battery branch circuit being connected in parallel with said secondary winding (7, 37) of the transformer (4) and having a polarity corresponding to the current pulses induced in said secondary winding (7, 37); and control means (11) for switching on said second switching transistor (13, 43) during the time interval when said first switching transistor is switched on but wherein said second switching transistor is switched on after said first switching transistor is switched on and is switched off before said first switching transistor is switched off.

2. The switched power supply of claim 1, wherein said improvement further includes each of the control pulses in said second set thereof being commenced later and finished earlier than a respectively corresponding control pulse in said first set thereof.

3. The switched power supply of claim 1, wherein said battery branch circuit includes a diode (12, 42) arranged with its polarity unidirectional with said second switching transistor.

4. The switched power supply of claim 2, wherein said battery branch circuit includes a diode (12, 42) arranged with its polarity unidirectional with said second switching transistor.

5. The switched power supply of claim 2, wherein said control means (11) includes a pulse generator for generating said first and second sets of control pulses (i1, i2) wherein the duration of said pulses is modulated in accordance with said output voltage.

6. The switched power supply of claim 3, wherein said control means (11) includes a pulse generator or generating said first and second sets of control pulses (i1, i2) wherein the duration of said pulses is modulated in accordance with said output voltage.

7. The switched power supply of claim 1, wherein said improvement further includes means (15, 16, 45, 46) coupled with said battery branch circuit for controlling charging current supplied to said battery during switching of said first switching transistor.

8. The switched power supply of claim 7, wherein said current controlling means includes a charging current control (15, 45) and a diode (12, 42) coupled in series with each other.

9. The switched power supply of claim 3, wherein said improvement further includes:

a charging current control (15, 45) for controlling the charging current supplied to said battery, a second diode (16, 46) coupled in series with said charging current control, and The series circuit including said charging current control and said second diode being coupled in parallel relationship with the combination of the diode in said battery branch circuit and said second switching transistor.

10. The switched power supply of claim 4, wherein said improvement further includes:

a charging current control (15, 45) for controlling the charging current supplied to said battery, and a second diode 16, 46 coupled in series with said charging current control, the series circuit including said charging current control and said second diode being coupled in parallel relation ship with the combination of the diode in said battery branch circuit and said second transistor, said second diode being arranged in a forward direction for the current pulses induced in said secondary winding.

11. The switched power supply of claim 1, wherein said control means includes means for inhibiting the generation of said pulses in said second set thereof when the voltage of said battery is below a preselected value thereof.

12. The switched power supply of claim 2, wherein said control means includes means for inhibiting the generation of said pulses in said second set thereof when the voltage of said battery is below a preselected value thereof.

13. The switched power supply of claim 3, wherein said control means includes means for inhibiting the generation of said pulses in said second set thereof when the voltage of said battery is below a preselected value thereof.

14. The switched power supply of claim 4, wherein said control means includes means for inhibiting the generation of said pulses in said second set thereof when the voltage of said battery is below a preselected value thereof.

15. The switched power supply of claim 5, wherein said control means includes means for inhibiting the generation of said pulses in said second set thereof when the voltage of said battery is below a preselected value thereof.

16. The switched power supply of claim 6, wherein said control means includes means for inhibiting the generation of said pulses in said second set thereof when the voltage of said battery is below a preselected value thereof.

17. The switched power supply of claim 7, wherein said control means includes means for inhibiting the generation of said pulses in said second set thereof when the voltage of said battery is below a preselected value thereof.

18. The switched power supply of claim 8, wherein said control means includes means for inhibiting the generation of said pulses in said second set thereof when the voltage of said battery is below a preselected value thereof.

19. The switched power supply of claim 9, wherein said control means includes means for inhibiting the generation of said pulses in said second set thereof when the voltage of said battery is below a preselected value thereof.

20. The switched power supply of claim 10, wherein said control means includes means for inhibiting the generation of said pulses in said second set thereof when the voltage of said battery is below a preselected value thereof.

21. The switched power supply of claim 12, wherein the improvement further includes signalling means actuatable before inhibiting the generation of said pulses by said inhibiting means.

22. The switched power supply of claim 13, wherein the improvement further includes signalling means actuatable before inhibiting the generation of said pulses by said inhibiting means.

23. The switched power supply of claim 14, wherein the improvement further includes signalling means actuatable before inhibiting the generation of said pulses by said inhibiting means.

24. The switched power supply of claim 15, wherein the improvement further includes signalling means actuatable before inhibiting the generation of said pulses by said inhibiting means.

25. The switched power supply of claim 16, wherein the improvement further includes signalling means actuatable before inhibiting the generation of said pulses by said inhibiting means.

26. The switched power supply of claim 17, wherein the improvement further includes signalling means actuatable before inhibiting the generation of said pulses by said inhibiting means.

27. The switched power supply of claim 18, wherein the improvement further includes signalling means actuatable before inhibiting the generation of said pulses by said inhibiting means.

28. The switched power supply of claim 19, wherein the improvement further includes signalling means actuatable before inhibiting the generation of said pulses by said inhibiting means.

29. The switched power supply of claim 20, wherein the improvement further includes signalling means actuatable before inhibiting the generation of said pulses by said inhibiting means.

* * * * *